Figure 1:
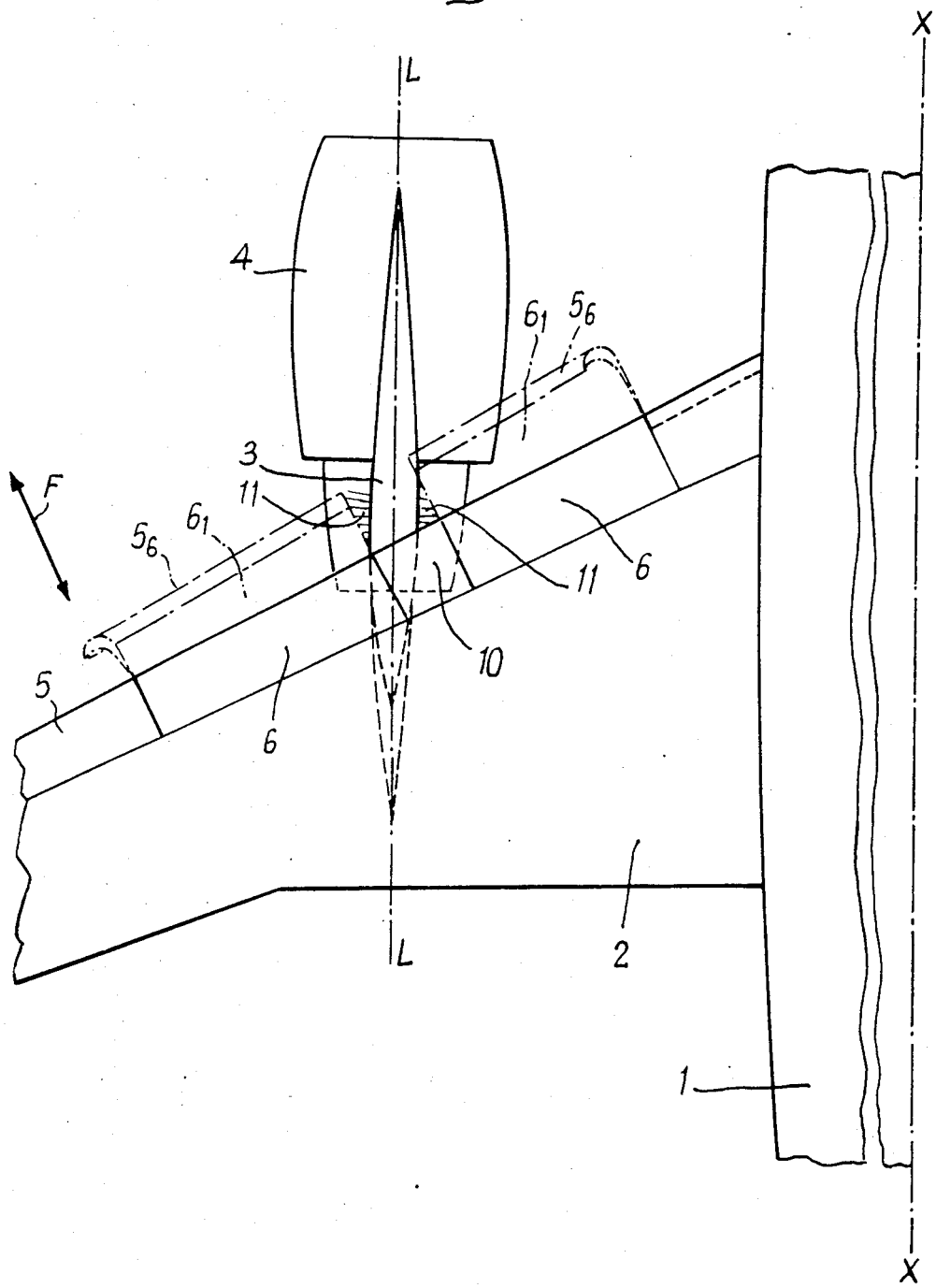

United States Patent [19]

Perin et al.

[11] Patent Number: 4,637,573

[45] Date of Patent: Jan. 20, 1987

[54] ARROWLIKE AIRCRAFT WING EQUIPPED WITH A HIGH-LIFT SYSTEM AND WITH A PYLON FOR SUSPENDING THE ENGINE

[75] Inventors: Robert Perin, Pibrac; Pierre Jourdan; Bernard Pauly, both of Blagnac, all of France

[73] Assignee: Societe Nationale Industrielle Aerospatiale, Paris, France

[21] Appl. No.: 676,867

[22] Filed: Nov. 30, 1984

[30] Foreign Application Priority Data

Dec. 6, 1983 [FR] France .................................. 83 19480

[51] Int. Cl.⁴ .............................................. B64D 29/02
[52] U.S. Cl. ....................................... 244/54; 244/130
[58] Field of Search ..................... 244/54, 55, 214, 130

[56] References Cited

U.S. PATENT DOCUMENTS 1,990,606  2/1935  Junkers ................................. 244/54
2,774,555  12/1956  Crawford et al. ................... 244/214
4,449,683  5/1984  Gratzer et al. .......................... 244/54
4,540,143  9/1985  Wang et al. ......................... 244/130

FOREIGN PATENT DOCUMENTS 98699    8/1978  Japan .................................. 244/214
2144688  3/1985  United Kingdom ................. 244/54

Primary Examiner—Trygve M. Blix
Assistant Examiner—Rodney Corl
Attorney, Agent, or Firm—Fisher, Christen & Sabol

[57] ABSTRACT

Aircraft wing equipped with high-lift flaps and with at least one pylon for suspending an engine. According to the invention, the upper part of the pylon is bent to avoid discontinuity of the wing leading edge between said pylon and the high-lift flaps regardless of whether or not said flaps are in out-spread position. The invention improves aerodynamic performances both in smooth configuration and in high-lift configuration.

5 Claims, 9 Drawing Figures

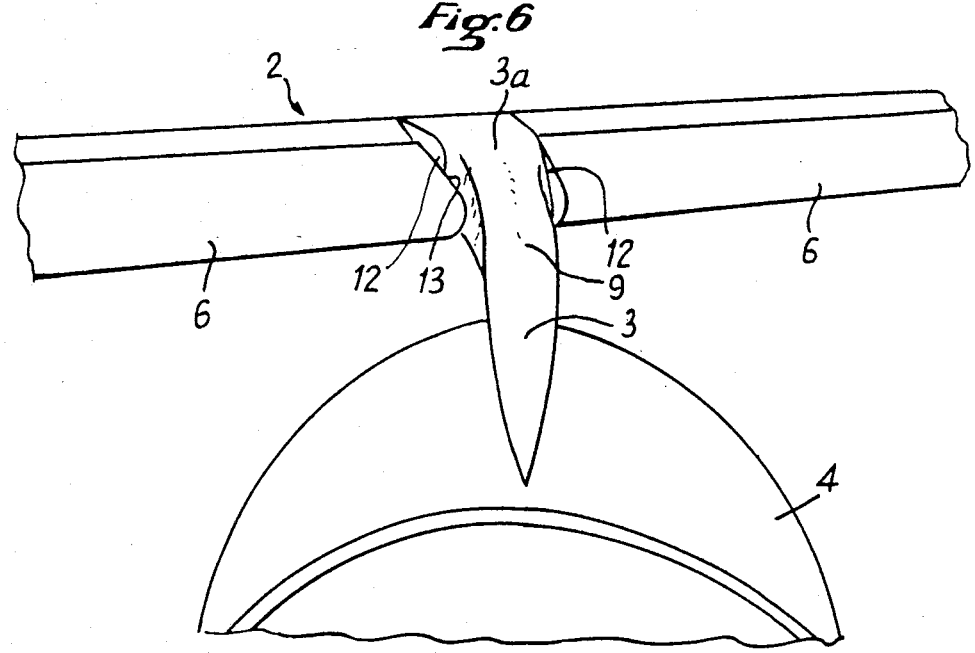
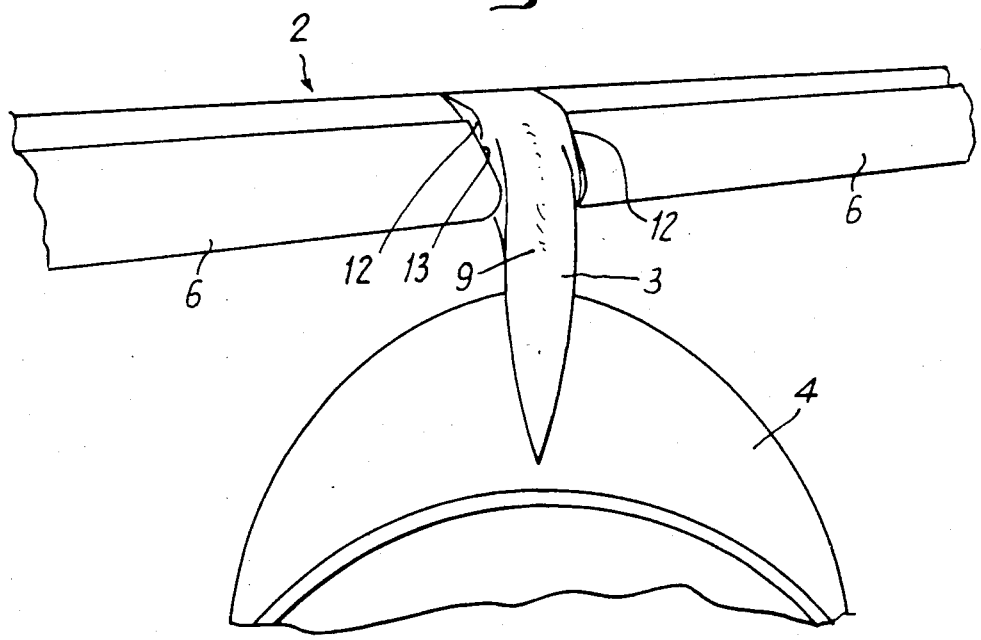

ARROWLIKE AIRCRAFT WING EQUIPPED WITH A HIGH-LIFT SYSTEM AND WITH A PYLON FOR SUSPENDING THE ENGINE

The present invention relates to an aircraft wing which is equipped with a high-lift system in its leading edge and under which is suspended at least an engine by means of a pylon. The invention further relates to an engine-suspending pylon for such a wing.

It is known that, for aerodynamic reasons, the wings of modern aircraft, and in particular large transport aircraft, are mounted arrowlike, namely that their leading edge is inclined rearward with respect to the longitudinal axis of the aircraft. And to increase their lift at low speed, essentially at take-off or landing, or whilst waiting to land, such aircrafts are equipped, in the leading edge of their wings, with a high-lift system comprising flaps adapted to move, orthogonally to said leading edge and in two directions, between a retracted position in which they are housed in recesses of the wings and form part of the leading edge, and the part adjacent the upper surface of said wings, and a high-lift out-spread position for which said flaps project from the said leading edge. The flaps in a high-lift system of this type are generally situated all along the leading edge, from the end of a wing, to close to their housing inside the fuselage.

In this type of aircraft, the engines are mounted below the wings by means of pylons connected to the lower wing surfaces thereof. Such a suspension pylon comprises an oblong horizontal section of longitudinal axis approximately parallel to the longitudinal axis of the aircraft and generally juts forward from said leading edge of the wings, its front edge being able to join up with the corresponding wing in the vicinity of the leading edge thereof.

With this type of suspension pylon, it is important to interrupt the high-lift system at the level of the pylon, so that every pylon is placed between two flaps of said high-lift system.

When the high-lift system is in the retracted position it is easy to adjust, appropriately to the aerodynamic conditions, namely to the minimum value just required by the clearance, the width of the slot between the side edges of the flaps directed to face a pylon, and the side edges facing the said recesses in the wings.

On the contrary, due to the fact that the longitudinal direction of a pylon and the moving direction of the high-lift flaps are concurrent, it is important, in the flap out-spread position, to leave wide gaps between a pylon and and the side edges of the flaps situated opposite thereof. Obviously, said gaps correspond to discontinuities in aerodynamic surfaces and as a result to a deterioration in the aerodynamic performances of the aircraft.

It is the object of the present invention to overcome this disadvantage and to obtain a better lift not only in the out-spread position of the high-lift flaps, but also in the retracted position thereof.

And to this end, the present invention proposes an aircraft wing whose leading edge is inclined with respect to the longitudinal axis of said aircraft and which, on the one hand, is provided in said leading edge, with a high-lift system comprising at least a flap adapted to move, orthogonally to the said leading edge and in two directiors, between a retracted position in which it is housed inside a recess of the wing and forms part of the leading edge, and a high-lift out-spread position in which said flap projects forward from said leading edge and on the other hand, forms part, on its lower wing surface, of at least a pylon for the suspension of the engine, said pylon having an oblong cross-section of longitudinal axis approximately parallel to the longitudinal axis of said aircraft, which overlaps frontwards of said leading edge of the wing and comprising a front edge which joins up with said wing in the vicinity of the leading edge, is remarkable in that the wall of the upper part of the pylon, which is situated so as to face said flaps is directed at least approximately orthogonally to said leading edge of the wing and is shaped so that in the outleading spread position as well an in any intermediate position between said out-spread and retracted positions, the gap which is provided between the flap and the wall, is just large enough to allow the movement of said flap.

Thus, except for the operating clearance, the interface between the pylon and the flap is virtually without any opening, so that continuity of the aerodynamic surfaces is ensured without fault in any configuration of said flap. Preferably, the width of the opening between the pylon and the adjacent flap is close to 25 mm.

When, in the conventional way, the high-lift system of a wing comprises two flaps arranged on either side of the pylon, each wall of the upper part of said pylon, which is situated opposite one of said flap, is directed at least approximately orthogonally to said leading edge of the wing and is shaped so that, in the out-spread position as well as in any intermediate position between said out-spread and retracted positions, the gaps existing between said flaps and said pylon, are just enough to allow the movement of said flaps.

The aerodynamic continuity is thus obtained on either side of the pylon.

And in this case, the upper part of the pylon forms a bend which is directed towards the fuselage of the aircraft. Tests conducted in a wind tunnel have shown that said bent upper part of the pylon permits, on the one hand, a better curvature, without separation, of the flowing lines going over the front edge (or leading edge) of the pylon and, on the other hand, a better continuity with any streamline structure placed at the lower surface of the wing, along the inner or outer face of said pylon. As a result, even on cruising flights, the aerodynamic performances of the aircraft are improved according to the invention.

The present invention therefore relates also to a streamlined pylon for suspending an engine under the wing of an aircraft whose leading edge is inclined with respect to the longitudinal axis of said aircraft, said pylon having an oblong cross-section and being designed to be made fast with said wing, on the lower surface side thereof, so that the longitudinal axis of its oblong cross-section is approximately parallel to the longitudinal axis of said aircraft, that it juts forward from the leading edge of the wing and that its front edge joins up with said wing close to the leading edge thereof, said wing being provided, in said leading edge, with a high-lift system comprising at least a flap adapted to move, orthogonally to said leading edge and in both directions, between a retracted position in which it is housed in a recess of the wing and forms part of the leading edge, and the part adjacent the upper surface thereof, and a highlift out-spread position in which the said flap projects forward from the leading edge. The pylon according to the invention is remarkable in that the wall of its upper part which is directed to face said flap is so shaped that, once the pylon has been fitted on the wing, said wall is directed at least approximately orthogonally to said wing leading edge, and that, in the out-spread position as in any intermediate position between the outspread and retracted positions, the opening or gap existing between the flap and the wall is just enough to allow the movement of said flap.

Preferably, in order to facilitate the production of a pylon according to the invention, the outer shape thereof can be produced in strong fibers (glass-, carbon, borum, and other fibers), coated with a polymerizable synthetic resin. It is therefore possible to use the methods used for shaping laminates to obtain the pylon according to the invention.

It should further be noted that the bent part of the pylon enables, owing to its shape, to improve the passage of various pipes and cables between the front part of said pylon and the inside of the wing leading edge, since bending of said pipes and cables is guided and more progressive than when the pylon is completely parallel to the aircraft axis.

Figure 2:
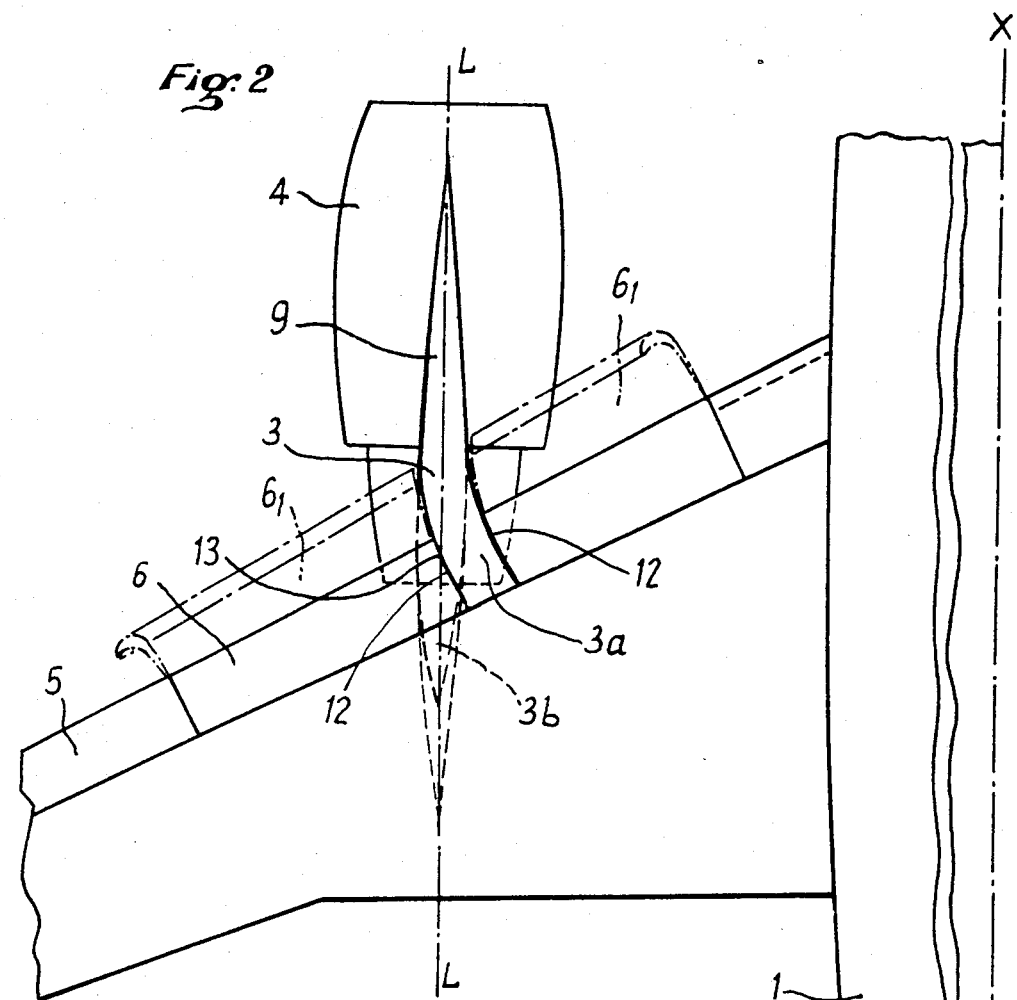
Figure 3:
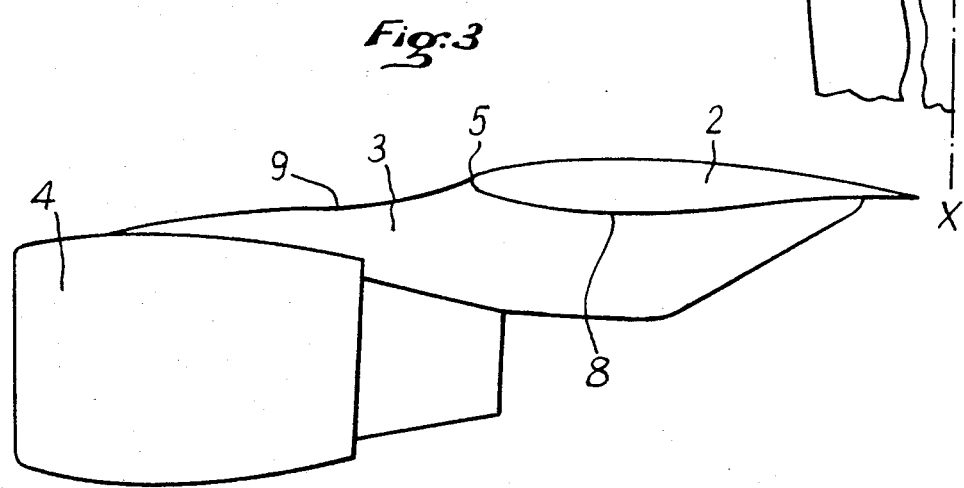
Figure 4:
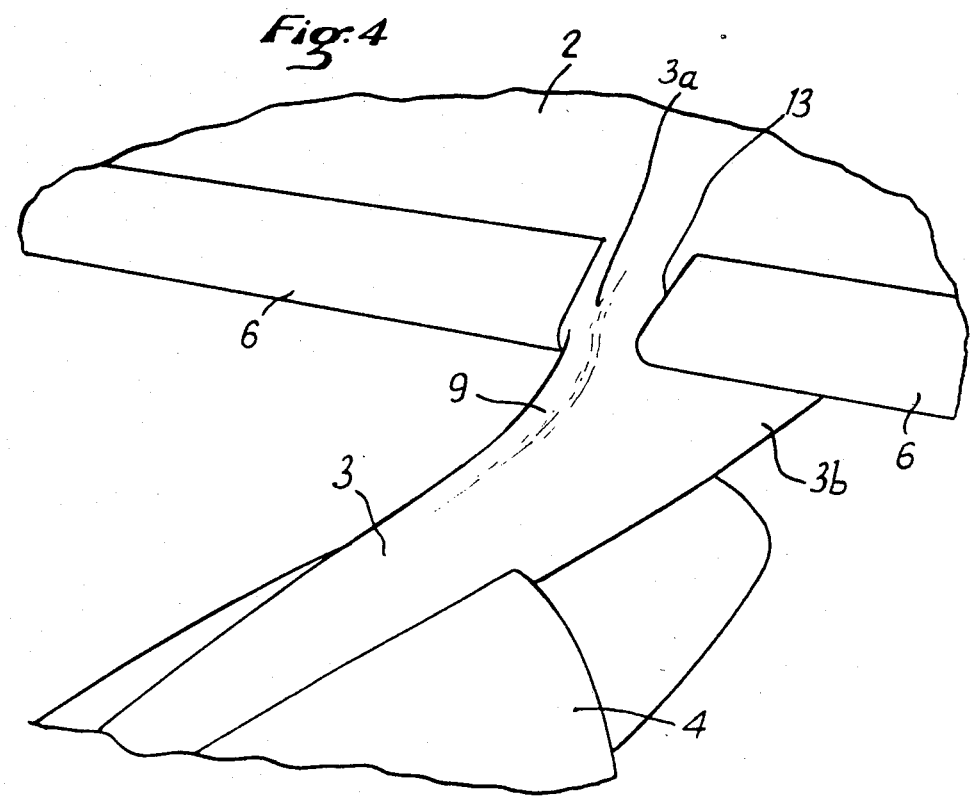
Figure 5:
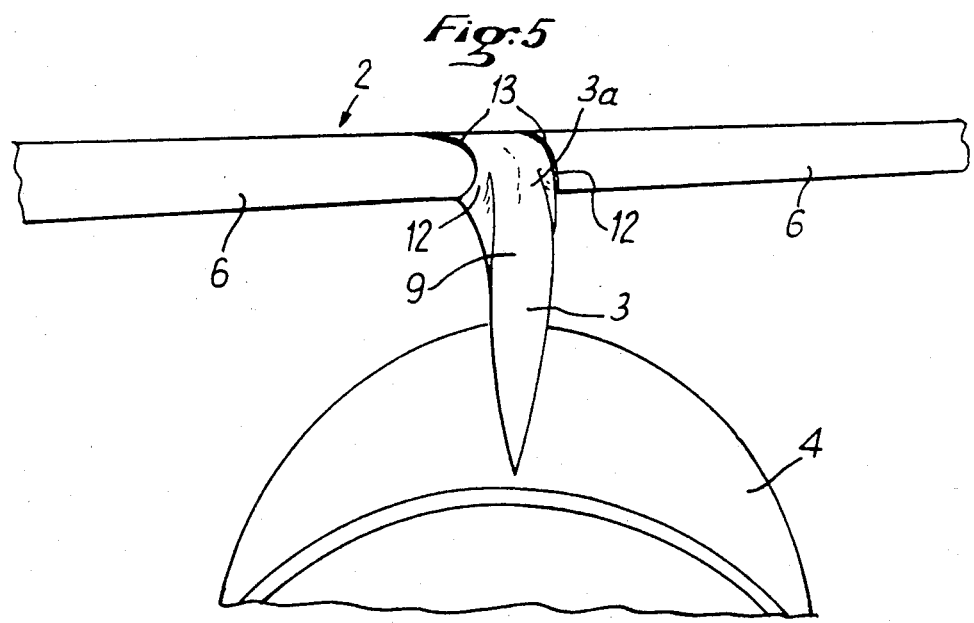
Figure 8:
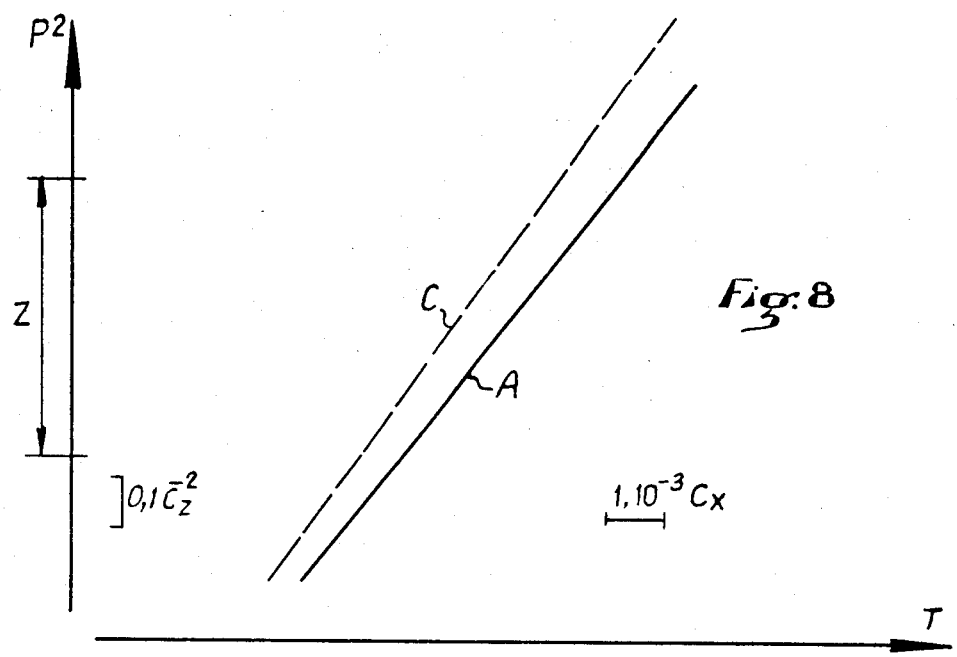
Figure 9:
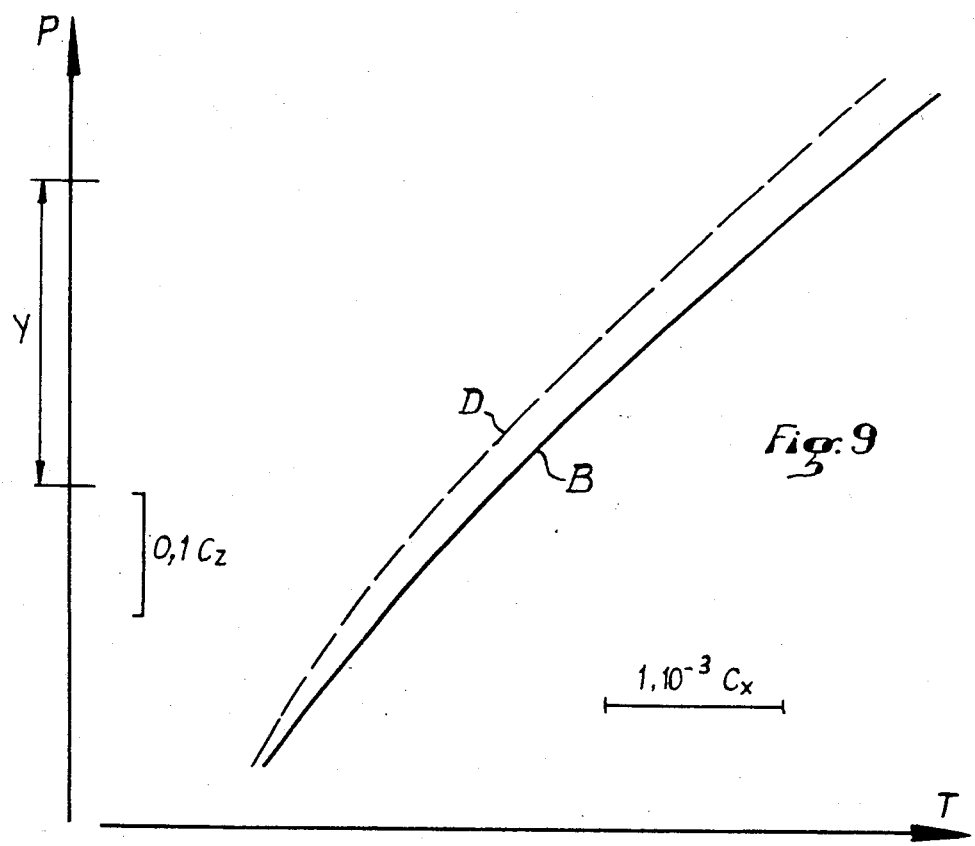

The present invention will be more readily understood on reading the following description with reference to the accompanying drawings, in which:

FIG. 1 is a diagrammatical plan view of part of an aircraft of a known type, showing part of a wing equipped with an engine, FIG. 2 is a diagrammatical view from beneath, corresponding to FIG. 1, of an aircraft according to the invention, FIG. 3 is an end view of the portion of wing with its engine, such as shown in FIG. 1 or FIG. 2, FIG. 4 is a perspective view of a wing portion according to the invention, the flaps of the high-lift system being in the retracted position, FIGS. 5, 6 and 7 are perspective views taken along the engine axis, of a wing portion according to the invention, seen from a different angle from that shown in FIG. 4, the flaps of the high-lift system being respectively, in the retracted position, in the intermediate position and in the out-spread position, FIG. 8 is a comparative diagram illustrating the variation of the square $P^2$ of the lift P as a function of the drag T, for a wing equipped with a conventional straight pylon and for a wing equipped with a bent pylon, respectively, the flaps being in the out-spread position, FIG. 9 is a comparative diagram illustrating the variation of the lift P as a function of the drag T, for a wing equipped with a conventional straight pylon and for a wing according to the invention equipped with a bent pylon, respectively, the flaps being in retracted position.

Referring first to FIG. 1, this shows a plan view of part of an aircraft comprising a fuselage 1 of longitudinal axis X—X and a wing 2 below which is fixed, via a pylon 3, an engine 4, the axis L—L of which is parallel to said axis X—X.

The leading edge 5 of wing 2 is inclined with respect to axes X—X and L—L and not orthogonal thereto.

In addition, pylon 3 is streamlined and has an oblong cross-section of which the large axis is parallel to axis L—L of engine 4.

Close to its leading edge 5, the wing 2 comprises on each side of pylon 3, a high-lift tip or flap 6 which, in the retracted position, is contained inside a housing provided in one part of the leading edge and of the upper surface of the wing 2. In the retracted position (illustrated in block lines), said high-lift flaps 6 form the part of the leading edge and of the upper surface of the wing 2 which corresponds to said housings. The retracted position of the high-lift flaps 6 inside their housing corresponds to a normal high speed flight.

During flight at low speed, such as for example when the aircraft takes off or lands, the flaps 6 take an outspread position $6_1$ (illustrated in dotted lines in FIG. 1), in which the flaps 6 project forward from the leading edge 5 and provide an air flowing passage between their lower surface and the upper surface of wing 2. The movement of the flaps 6 to pass from their retracted position to their out-spread position and vice-versa, takes place in an orthogonal direction with respect to the leading edge 5 (see double arrow F), namely in a direction non-parallel to axes X—X and L—L.

The wing 2 is connected to pylon 3 on both sides of the base thereof, along a line 8 which goes from its lower surface up to the leading edge 9 of said pylon 3 which encloses (in 10) the leading edge 5 of wing 2 (FIG. 3).

Thus, in the retracted position of flaps 6, the leading edge 5 of the wing presents no discontinuity with respect to the upper surface on either side of pylon 3, and the interface between the flaps 6 and the pylon 3 has no gaps.

In the out-spread position $6_1$ of the high-lift flaps 6, on the contrary, there are discontinuities 11 (hatched in FIG. 1) between said flaps and pylon 3, on either side of the latter, due to the non-parallelism between the longitudinal axis of the pylon cross-section and the direction F of the movement of said flaps 6.

As indicated hereinabove, the object of the present invention is to overcome the bad influence on the performances of the aircraft which is due to the discontinuities in the out-spread position of the flaps 6.

To this effect, and as illustrated in FIGS. 2 and 4 to 7, the walls 12 of the upper part 3a of pylon 3, which are in facing relation to flaps 6, are directed at least approximately orthogonally with respect to the leading edge 5 of the wing 2, and are so shaped that, in out-spread position (illustrated in dotted lines in FIG. 2 and in FIG. 7), as well as in any intermediate position (as illustrated in FIG. 6) between the retracted position (illustrated in block lines in FIG. 2 and in FIGS. 4 and 5) and the out-spread position, the gaps 13 existing between said flaps 6 and the walls 12 of pylon 3 are just enough to allow the movement of said flaps 6.

Thus, as clearly illustrated in FIG. 2, the upper part 3a of pylon 3 is bent towards axis X—X, with respect to the remaining part 3b of pylon 3 which is situated on the wing lower surface side.

The outer shapes of pylon 3 may be produced from a laminate of strong fibers coated with synthetic resin.

Owing to the curvature (or camber) of the upper part 3a of pylon 3 in the deflection zone of flaps 6, the continuity of the leading edge 5 is ensured, whether the flaps 6 are in their retracted position or in their out-spread position, or in any other intermediate position therebetween.

Moreover, and as illustrated diagrammatically in the figures, it is advantageous for the pylon 3 to enclose part of the leading edge 5 of the wing 2 by its part 3a.

It is thus obvious that according to the invention, it is possible to ensure a gap-free interface between flaps 6 and pylon 3, when the aircraft flies at low speed.

In order to verify the improvements brought by the invention, comparative tests have been conducted inside a wind tunnel on a portion of wing 2 equipped with an engine 4 : in the first case, said portion of wing 2 was supporting the engine 4 via a conventional pylon 3, as illustrated in FIG. 1; in the second case, the same portion of wing 2 was supporting the same engine 4 via a pylon 3 according to the invention, said pylon having a bent upper part 3a, as illustrated in FIGS. 2, and 4 to 7. Said comparative tests were conducted with the flaps 6 in out-spread position (FIG. 8), namely in take-off configuration, and in retracted position (FIG. 9), namely in cruising configuration. In said FIGS. 8 and 9, the results concerning the known pylon 3 are illustrated by curves A and B (shown in block lines in the figures), whereas the results corresponding to the pylon according to the invention are illustrated by curves C and D (in broken lines). In FIG. 8, which represents the square $P^2$ of the lift P as a function of the drag T, Z illustrates the area corresponding to take-off. Likewise, in FIG. 9 which illustrates the lift P as a function of the drag T, Y illustrates the area corresponding to the cruising flight.

It is then clear that the aerodynamic performances of an aircraft equipped with an engine suspension pylon according to the invention are improved, not only in the outspread position of the high-lift flaps, but also in the retracted position thereof.

We claim:

1. An aircraft having a longitudinal axis and an aerodynamic pylon for suspending an engine nacelle below a wing of the aricraft, comprising:
   (a) said wing having a leading edge, an upper surface and a lower surface, and said wing having a predetermined sweep angle with respect to said longitudinal axis of said aircraft;
   (b) a high-light flap system arranged in said leading edge of said wing and comprising one flap which is displaceable orthogonally with respect to said leading edge between a retracted position and a high-lift out-spread position, said flap being housed inside said wing and forming part of said leading edge and the adjacent part of said upper surface in said retracted position, and said flap projecting forward from said leading edge in said high-lift out-spread position;
   (c) said nacelle mounted below said lower surface and forwardly of said leading edge; and
   (d) said aerodynamic pylon having an oblong cross-section and being positioned such that the longitudinal axis of said cross-section is approximately parallel to said air-craft longitudinal axis, said aerodynamic pylon projecting forward from said leading edge of said wing and comprising a front edge joining up with said wing in the vicinity of the leading edge thereof and said aerodynamic pylon having an upper part adjacent said leading edge that is bent longitudinally inwardly toward said longitudinal axis of said aircraft, said upper part having a shape such that in said out-spread position and in any intermediate position between said out-spread and said retracted positions, the gap existing between said flap and said upper part is just enough to allow for the movement of said flap.

2. An aircraft according to claim 1, wherein said aerodynamic pylon is constructed at least partly of resistant fibers embedded in synthetic resin.

3. An aircraft having a longitudinal axis and an aerodynamic pylon for suspending an engine nacelle below a wing of the aircraft, comprising:
   (a) said wing having a leading edge, an upper surface and a lower surface, and said wing having a predetermined sweep angle with respect to said longitudinal axis of said aircraft;
   (b) a high-lift flap system arranged in said leading edge of said wing and comprising two flaps which are displaceable orthogonally with respect to said leading edge between a retracted position and a high-lift out-spread position, said flaps being housing inside said wing and forming part of said leading edge and the adjacent part of said upper surface in said retracted position, and said flaps projecting forward from said leading edge in said high-lift out-spread position;
   (c) said nacelle mounted below said lower surface and forwardly of said leading edge;
   (d) said aerodynamic pylon having an oblong cross-section and being positioned such that the longitudinal axis of said cross-section is approximately parallel to said aircraft longitudinal axis, with said aerodynamic pylon projecting forward from said leading edge of said wing and comprising a front edge adjoining said wing in the vicinity of the leading edge thereof and with said aerodynamic pylon having an upper part adjacent said leading edge that is bent longitudinally inwardly toward said longitudinal axis of said aircraft, said upper part having a shape such that in said out-spread position and in any intermediate position between said out-spread and said retracted positions, the gap existing between each of said flaps and said upper part is just enough to allow for the movement of said flaps.

4. An aircraft according to claim 3, wherein said aerodynamic pylon is constructed at least partly of resistant fibers embedded in synthetic resin.

5. An aircraft as claimed in claim 3, wherein said suspension pylon is placed between said flaps of said high-lift system.

* * * * *